United States Patent [19]

Müller et al.

[11] Patent Number: 4,997,019

[45] Date of Patent: Mar. 5, 1991

[54] TIRE TRACTION CHAIN WITH TRACTION PLATES

[75] Inventors: Anton Müller, Aalen-Unterkochen; Karl Herdeg, Aalen, both of Fed. Rep. of Germany

[73] Assignee: Eisen- und Drahtwerk Erlau Aktiengesellschaft, Aalen, Fed. Rep. of Germany

[21] Appl. No.: 328,465

[22] Filed: Mar. 24, 1989

[30] Foreign Application Priority Data

Mar. 25, 1988 [DE] Fed. Rep. of Germany ... 8804052[U]
Sep. 17, 1988 [DE] Fed. Rep. of Germany ....... 3831626

[51] Int. Cl.$^5$ ............................................. B60C 27/20
[52] U.S. Cl. .................................... 152/223; 152/242; 152/244

[58] Field of Search ............... 152/208, 213 R, 213 A, 152/221–223, 225 R, 225 C, 226, 227–232, 239–245; 301/42; 59/93; 81/15.8

[56] References Cited

U.S. PATENT DOCUMENTS

| 1,420,667 | 6/1922 | Randle | 152/228 |
| 1,739,237 | 12/1929 | Karn | 152/222 |
| 3,079,972 | 3/1963 | Forman | 152/225 R |
| 3,714,976 | 2/1973 | Caldwell | 152/228 |

Primary Examiner—Michael W. Ball
Assistant Examiner—Gregory J. Wilber
Attorney, Agent, or Firm—Robert W. Becker & Associates

[57] ABSTRACT

A tire traction chain having a tread or contact section with spikes, and two side sections. The tread or contact section includes plate-like contact section parts in which the spikes are secured. The contact section parts are linked with one another.

43 Claims, 6 Drawing Sheets

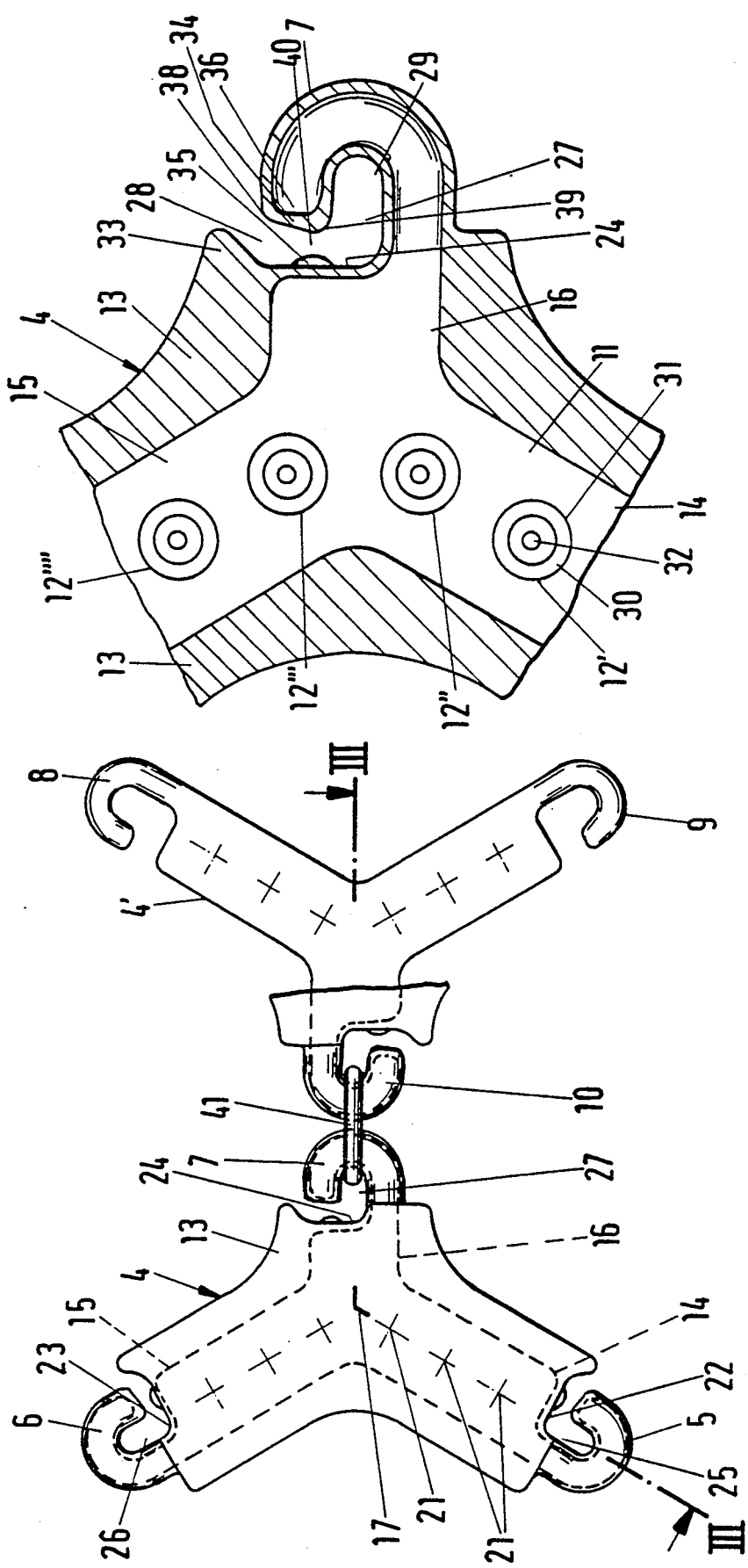

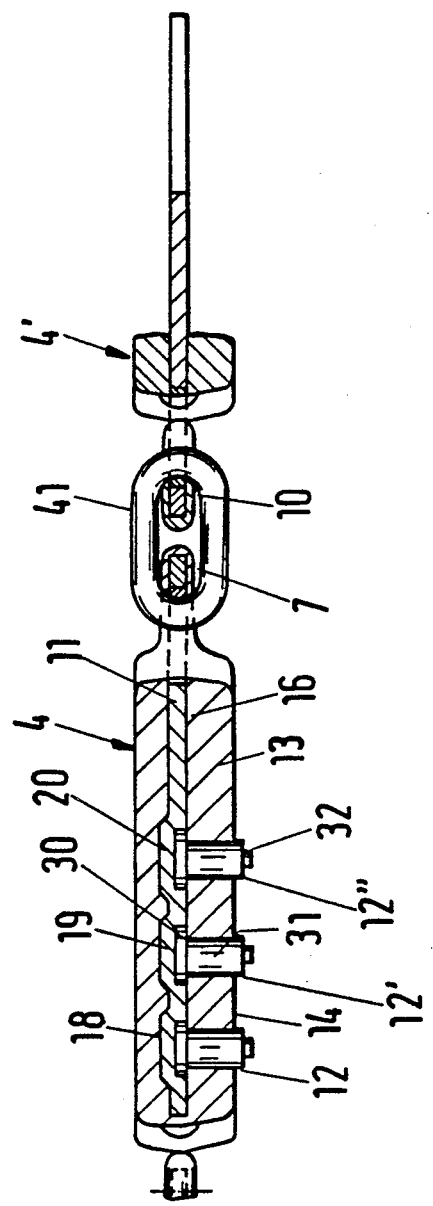

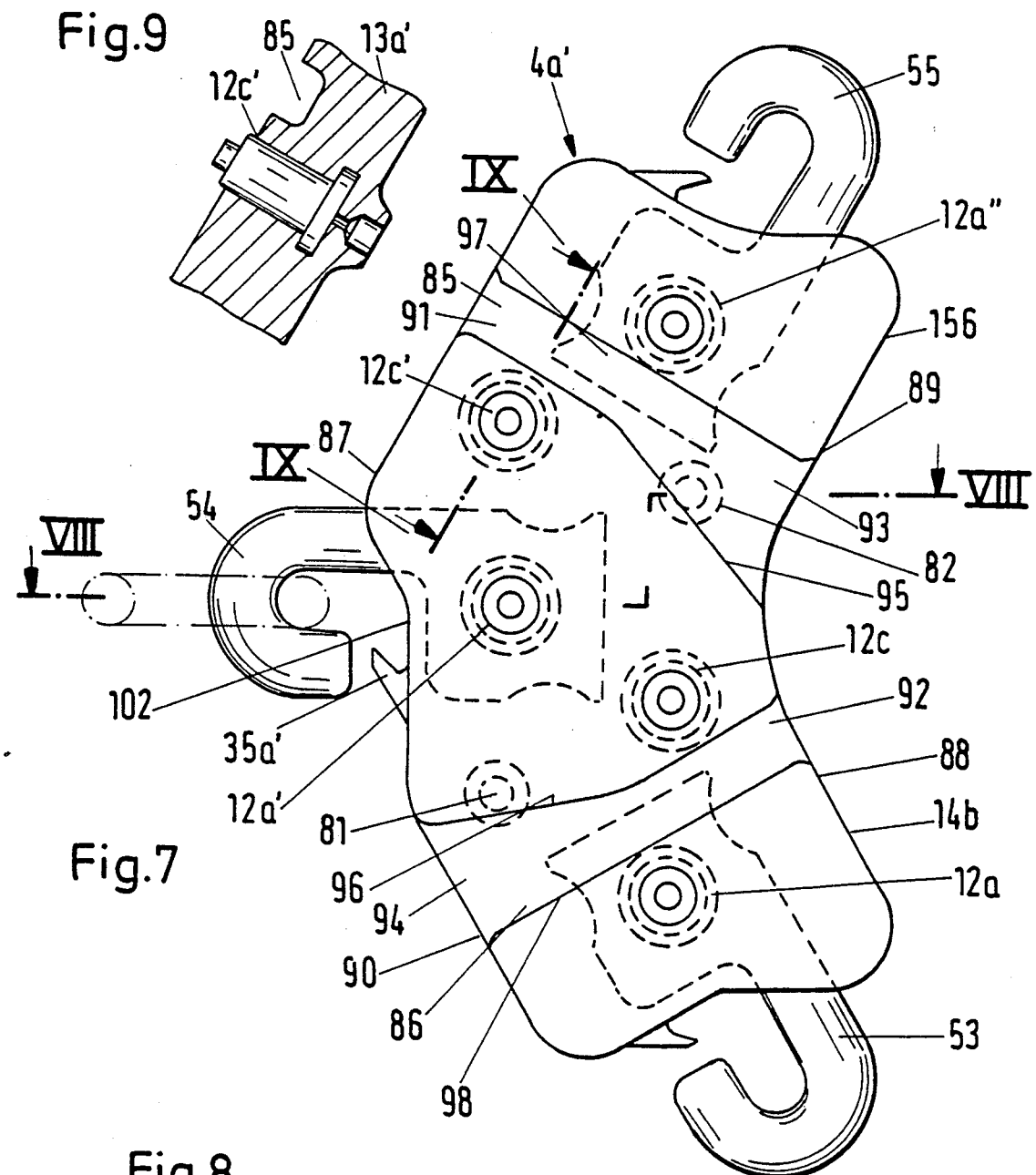
Fig.9
Fig.7
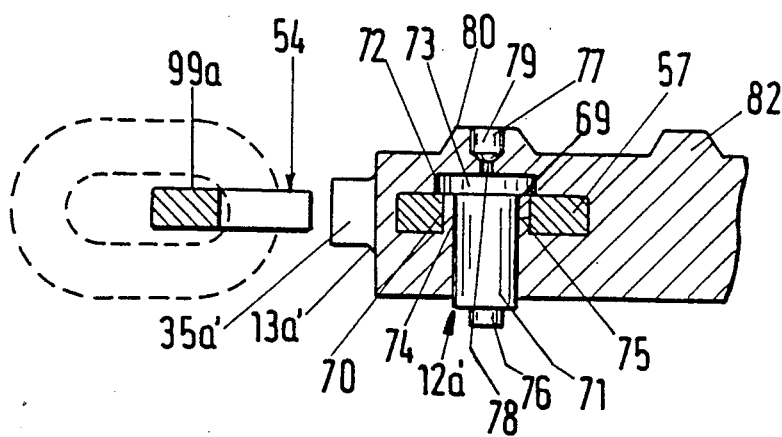
Fig.8

TIRE TRACTION CHAIN WITH TRACTION PLATES

BACKGROUND OF THE INVENTION

The present invention relates to a tire traction or antiskid chain that has a tread or contact section with spikes, and two side sections.

With heretofore known tire traction chains of this type, the tread or contact section is made completely of rubber or plastic, so that the tread or contact section is very bulky, and the tire traction chain can therefore not be collapsed to form a small package. As a result it is necessary to provide large packages for the heretofore known tire traction chains. In addition, it is difficult to mount the known tire traction chains. A further drawback is that these known chains are not very much more efficient when used on snow-covered roadways than are winter tires that are used without tire traction chains.

It is therefore an object of the present invention to embody a tire traction chain in such a way that it can be placed in a small package, can be rapidly mounted, and can be used under all winter street conditions.

BRIEF DESCRIPTION OF THE DRAWINGS

This object, and other objects and advantages of the present invention, will appear more clearly from the following specification in conjunction with the accompanying schematic drawings, in which:

FIG. 2 is an enlarged view showing two interconnected contact section parts of the inventive tire chain of FIG. 1;

FIG. 3 is a cross-sectional view taken along the line III—III in FIG. 2;

FIG. 4 is an enlarged cross-sectional view of a portion of one of the contact section parts of FIG. 2;

FIG. 7 is an enlarged view of one contact section part of the tire chain of FIG. 5;

FIG. 8 is a cross-sectional view taken along the line VIII—VIII in FIG. 7;

FIG. 9 is a cross-sectional view taken along the line IX—IX in FIG. 7;

SUMMARY OF THE INVENTION

The tire traction chain of the present invention is characterized primarily in that the tread or contact section is comprised of plate-like contact section parts in which the spikes are secured, with the contact section parts being linked with one another and with the side sections.

As a consequence of the inventive construction, the tread or contact section is provided with interlinked contact section parts that have spikes. As a result, the tread or contact section, and hence the tire traction chain, can be collapsed and placed in small packages. Furthermore, due to the interlinking of the contact section parts, with the tread or contact section comprising, for example, annular and/or stud links, a rapid and standing mounting is possible, so that the tire traction chain can be mounted easily and rapidly, and loose mounting accessories are eliminated. The inventive contact section parts are suitable for use for all tread or contact sections, for example fine-link, long-link, or elongated tread or contact sections, and can also be used for crossed treads, such as Y-crosses. In addition, the inventive tire traction chain is equally suitable for use under all winter street conditions, such as snowy or icy roadways.

Further specific features of the present invention will be described in detail subsequently.

DESCRIPTION OF PREFERRED EMBODIMENTS

Figure 1:
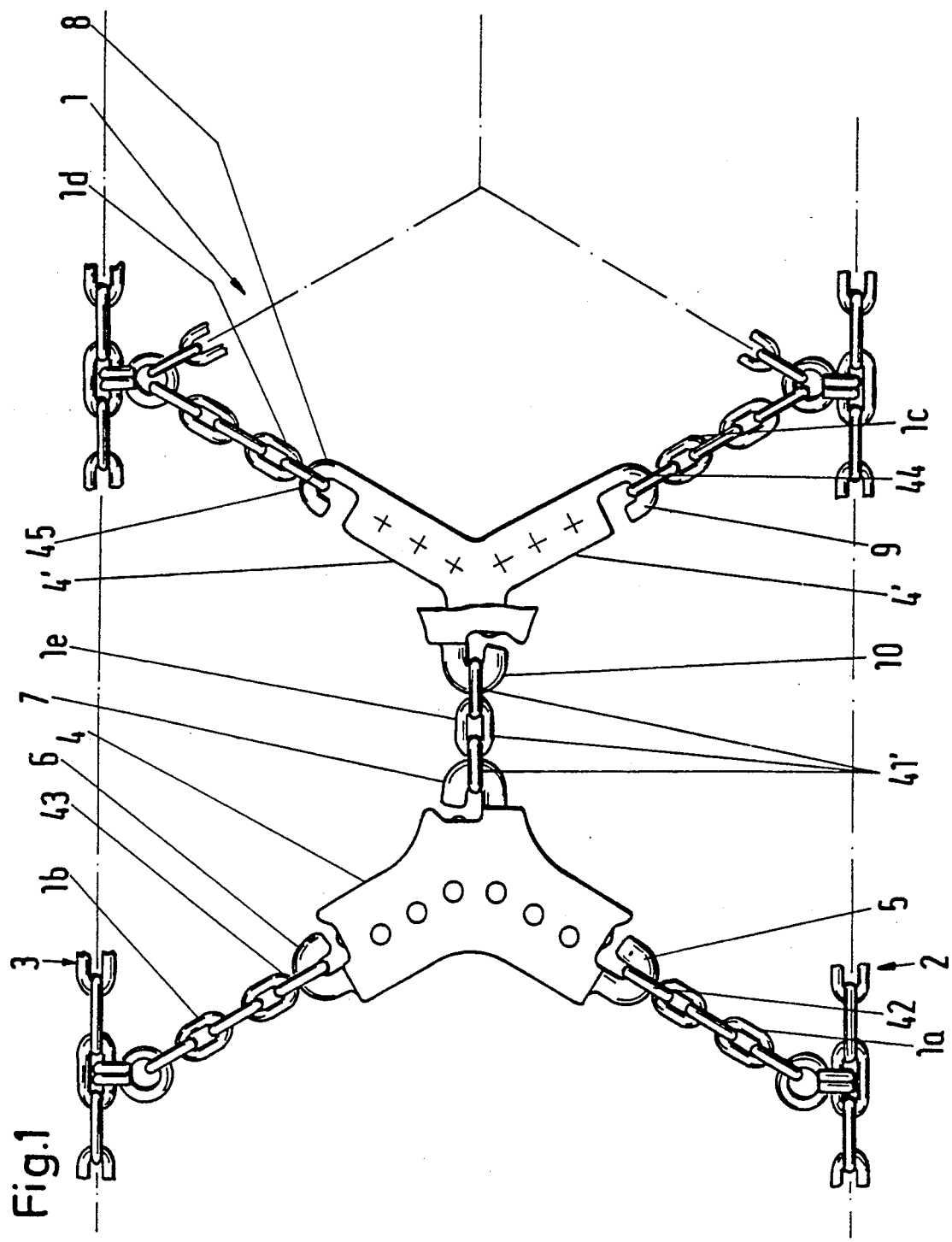
FIG. 1 is a partially broken-away view of a portion of one exemplary embodiment of the inventive tire chain with a tread or contact section that is provided with contact section parts having spikes.

Referring now to the drawings in detail, the tire traction or antiskid chain illustrated in FIG. 1 has a tread or contact section 1 that is connected to side sections 2 and 3. The tread or contact section 1 preferably comprises identical, approximately Y-shaped contact section parts 4, 4' that, as shown in FIG. 1, are connected to the side sections 2, 3 as well as to one another via hooklike ends 5 to 10 and via chain portions 1a to 1e.

In the tread or contact section 1, respectively adjacent contact section parts are disposed in a mirror-inverted manner relative to one another. As will be described in conjunction with the contact section part 4, the contact section parts are provided with a plate-like support body 11 that carries a plurality of spacedapart spikes 12, 12', 12", etc., and that is surrounded by a sheathing 13 that is preferably made of rubber or plastic.

The support body 11 is made of metal and is provided with three arms 14 to 16 that are disposed at the same angular spacing relative to one another. The arms 14, 15 that are disposed transverse to the circumferential direction of the tread or contact section 1 are preferably several times longer than the arm 16 that is disposed in the longitudinal direction of the tread or contact section 1. In the illustrated embodiment, the short arm 16 is at most half as long as the arms 14, 15, although it could also be either shorter or longer than this. However, the shorter length of the arm 16 has the advantage that the contact section parts 4 can form relatively small contact section meshes, thereby increasing the gripping or traction effect of the tread or contact section 1. The arms 14, 15 are provided with approximately equally spaced-apart recessed portions 18 to 20 (FIG. 3) that are formed by definitions of the arms, which definitions have an approximately trapezoidal longitudinal cross-sectional configuration. The center points 21 of these recessed portions are disposed on longitudinal central planes of the arms 14, 15 that intersect at the point 17 (FIG. 2) with the longitudinal central plane of the arm 16.

The hook-like ends 5 to 7 of the contact section part 4 each delimit an essentially L-shaped hook opening 25 to 27 that are identical to one another and are formed by an appropriate stamping or punching-out at the end of the arms 14 to 16. As illustrated in FIG. 4, an introduction opening 28 opens into the hook opening 27 of the arm 16. The hook opening 27 has a suspension opening 29 for the corresponding chain link. In the mounted state, the longitudinal axis of the suspension opening 29 is disposed in the circumferential direction of the tread or contact section 1, whereas the longitudinal axes of the suspension openings of the two other hook openings 25 and 26 are disposed at an angle to the circumferential direction of the tread or contact section 1.

As can be seen in FIGS. 3 and 4, a disk-shaped head 30 of the spikes 12, 12', and 12" is disposed in the recessed portions 18 to 20, and a cylindrical pin or shaft part 31 of the spikes extends beyond the arm 14 of the support body 11. At the end face of the shaft part 31 the spikes are provided with profiled studs 32 that preferably have a circular cross-sectional configuration. The diameter of each stud 32 is approximately only half as great as the diameter of the shaft part 31, and assures together with the shaft part a high traction.

The support body 11 is completely surrounded by the sheathing 13 which, however, is considerably thinner in the region of the hook-like ends 5 to 7 than in the remaining region. As shown in FIG. 4, on both sides of the arms the sheathing projects beyond the arms by nearly half the width of the arms, whereas in the region of the hooks the sheathing is considerably thinner than the width of the hook ends 5 to 7. As can be seen from FIG. 3, on that side of the support body 11 that is provided with the spikes 12, 12', 12", the sheathing has a thickness that is slightly less than the length of the shaft parts 31. On the opposite side, the sheathing surrounds the definitions, as a result of which on this side the sheathing is slightly thinner than on the side of the spikes. When looking at the plan view of FIG. 2, the contour of the sheathing 13 corresponds approximately to the contour of the support body 11. The sheathing 13 delimits the introduction opening 28 of the hook openings 25 to 27 via linear end faces 22 to 24 on that side that faces the hook ends.

Adjacent to the end faces 22 to 24, the sheathing 13 is provided with respective outwardly extending, nose-like projections 33 (FIG. 4). Also provided at the end faces 22 to 24 are respective knob-like projections 35 that are rounded off in a dome-like manner and have approximately the same width as the adjacent end face 34 of the free end 36 of the arm end 7 That portion of the sheathing 13 that is across from the projection 35 and covers the end face 34 increases continuously in thickness from the outer corner region 38 to the inner corner region 39, so that in the corner region 39 the thickness of the sheathing is nearly twice as great as in the corner region 38. As a result, in the region between the projection 35 and the thickened portion of the sheathing portion, a narrowing 40 of the introduction opening 28 is formed. This narrowing 40 assures that a suspended connecting link 41 (FIG. 2) cannot unintentionally become unhooked. The outwardly open portion of the introduction opening 28 has a narrower inside width than does the suspension opening 29. In addition, as a result of the previously described projection 33, the introduction opening 28 extends at an angle, so that the connecting link, even if it should unintentionally pass outwardly through the narrowing 40 into the introduction opening, cannot become unhooked from the hook end 7 without being pivoted. Due to this angular orientation, and the arrangement of the projection 35, the connecting link 41 is reliably suspended in the end 7. The same also applies to the end 10 of the adjacent contact section part 4', which is connected with the contact section part 4 via the connecting link 41. The connecting link 41 is an annular link that can preferably have a round or quadratic crosssectional configuration. In place of the annular link 41, it is also possible to provide a chain portion 1e between the contact section parts 4, 4', with this chain portion 1e comprising three annular links 41' as shown in FIG. 1. As also shown in FIG. 1, the ends 5, 6 and 8, 9 of the contact section parts 4, 4' are preferably connected to annular links 42 to 45 of the chain portions 1a to 1d, with these annular links again having a round or quadratic cross-sectional configuration. The chain portions can, for example, also be comprised of stud or annular links. The connecting links 41' can also be embodied in a different manner than the chain links of the side sections or side chains 2, 3. For example the connecting links can be comprised of four-cornered chain links, while the side sections can be comprised of round steel chain links.

The spikes 12, 12', 12", etc. are disposed in such a way that each spike can independently exert a driving or braking function The end faces of the head 30, as well as the shaft part 31 and/or the profiled stud 32, are preferably profiled, so that on the one hand a very reliable retention in the pertaining receiving means 18 to 20 is assured, and on the other hand a great traction of the spikes on the ground is assured. The profiled configuration of the spikes furthermore assures traction so that the tire cannot slide within the tire chain due to protrusion of the spikes and in addition the braking action and traction is improved, especially in soft snow.

If necessary, for example when worn or to regalvanize the side sections 2, 3, the contact section parts 4, 4' can at any time be replaced or removed.

The height of the spikes 12, 12', etc. is adapted to the chain links and the side sections 2, 3 in such a way that a quiet operation of the traction chain is assured. As a consequence of the use of the inventive contact section parts 4, 4', the described traction chain can be used not only as a snow chain and as a chain on icy ground, but also for all other winter street conditions that are encountered.

The embodiment illustrated in FIGS. 5 to 12 differs essentially from the previously described embodiment in that instead of the support body 11, preferably respectively three hook parts 50–52, 53–55 are embedded in the sheathings 13a, 13a'. Compared to the support body 11, the hook parts 50 to 55 have the advantage that the associated spikes 12a, 12a', 12a", 12b, 12b', 12b", 12c, 12c', 12d, 12d' have a high flexibility. The track or contact section parts 4a, 4a' can thereby satisfactorily absorb a high continuous load.

A further difference between the track or contact section parts 4a, 4a' and the contact section parts illustrated in FIGS. 1 to 4 is that the track parts 4a, 4a' have only two arms 14a, 15a or 14b, 15b that extend in a V-shaped manner relative to one another, with the hook parts 52, 54 being provided in place of the facing shorter arms 16 of the contact section parts 4, 4'. Finally, on the tire contact and wear sides of the track parts 4a, 4a' of FIGS. 5 to 12, which sides face the tire and the roadway, profiled elements are provided, as will be described in detail subsequently.

The track parts 4a, 4a' are arranged in a mirror-inverted manner relative to one another in such a way that the introduction openings of the hook parts 50 to 55 face one another.

Figure 12:
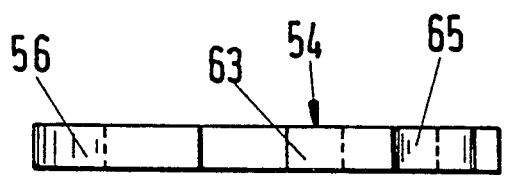
FIG. 12 is an end view taken in the direction of the arrow XII in FIG. 11.
Figure 11:
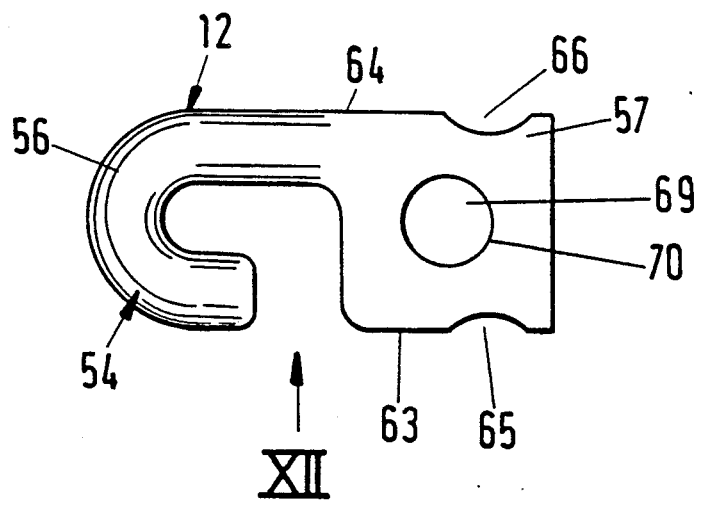
FIG. 11 is a plan view of a hook part of FIG. 7.

The hook parts 50 to 55, which will be described in detail in conjunction with the hook part 54 of FIGS. 11 and 12, are provided with a plate-like holding part 57 that has an essentially square contour and is integral with the hook 56.

The hooks 56, 58 to 62 correspond to the hook-like arm ends 5 to 10 of the arms 14 to 16 of the embodiment illustrated in FIG. 1. As shown in particular in FIG. 10, the holding parts 57 of the hook parts are securely embedded and anchored in the sheathing 13a. For this purpose, each of the two edges 63, 64 of the holding part 57 that extend parallel to the longitudinal direction of the hook part 54 is provided with a concave recess 65, 66 that is preferably in the shape of part of a circle. These recesses are filled by parts 67, 68 of the sheathing 13a', resulting in a positive connection between the sheathing and the hook part 54, thereby reliably preventing the hook part from being pulled or torn out in the direction of the arrow Z.

To receive a respective spike, each of the hook parts 50 to 55 is provided with a central opening 69 (FIG. 11) in the holding part 57 thereof. A shaft 71 of the respective spike extends through the opening 69, with the rim 72 of a preferably disk-shaped head 73, which is provided on one end of the spike, resting against the holding part 57 adjacent to the edge 70 of the opening 69 (FIG. 8). With the head 73 resting against the holding part 57, a reliable support and a precise, perpendicular orientation of the spike relative to the hook part and the sheathing are assured. As a result, the spike 12a' has a high resistance to being pulled out.

As further shown in FIG. 8, the shaft 71 of the spike 12a' is disposed with radial clearance in the opening 69. The annular space 74 between the shaft 71 and the edge 70 of the opening 69 is filled with the material of the sheathing 13a', which is preferably made of rubber or plastic. As a result, the sheathing forms a plastic bed for the spike in the annular space 74, so that when high loads are encountered, the spike can give some. As a result, damage to the spike and to the contact section or track parts 4a, 4a', as well as pulling out of the spike, are reliably prevented.

At that end that is remote from the head 73 and that extends beyond the sheathing 13a', the spike 12a' (FIG. 8), in a manner similar to the spikes 12, 12', 12" of the embodiment of FIGS. 1 to 4, is provided with a profiled stud 76 that is preferably cylindrical and has a smaller diameter than does the shaft 71.

As shown in FIG. 8, a securing element 77, such as a pin, a screw, or the like, rests against the head 73 of the spike 12a' to hold the head 73 in contact with the holding part 57 of the hook part 54. A tapered end 78 of the securing element 77 rests against the head 73, while a head 79 of the securing element 77 is disposed in an opening of a knob-like projection 80.

Figure 6:
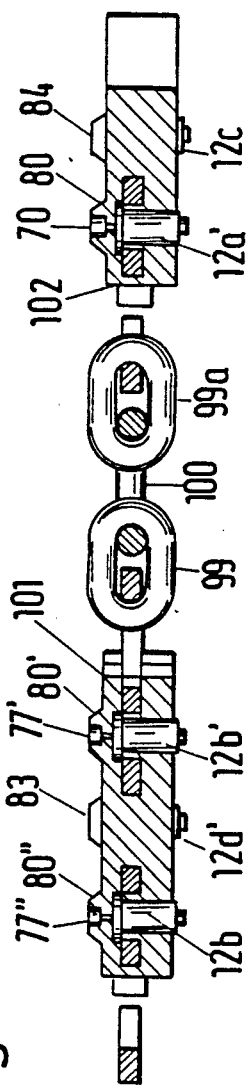
FIG. 6 is a cross-sectional view taken along the line VI—VI in FIG. 5.
Figure 10:
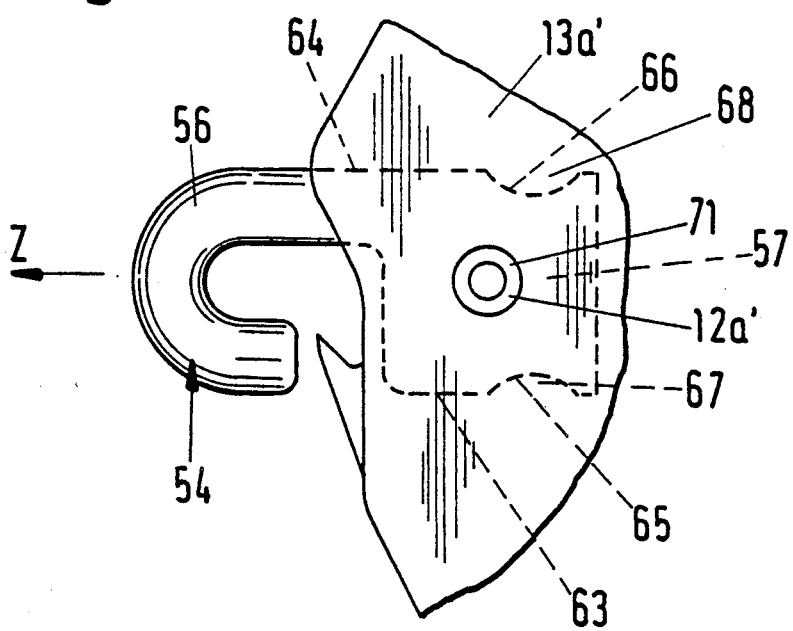
FIG. 10 is a view that shows a portion of the contact section part of FIG. 7 with a hook part.

As shown in particular in FIG. 6, such a projection 80, 80', 80" is associated with each spike 12a', 12c, 12b, 12d', 12b', i.e. with each securing element 77, 77', 77". In addition to these projections, further projections 81, 82, 83, 84 are provided (FIGS. 6 to 8). These projections are embodied in the same manner as the projections 80', 80", 80''', that are tapered to the outside in the manner of a truncated cone. In the mounted state of the tire chain, the end faces of these projections are supported on the tread of the tire.

The projection 81 is disposed in the arm 14b, while the projection 82 is disposed in the arm 15b. The projections 81, 82 are preferably disposed adjacent to one another and at a distance from the projections of the spikes 12c, 12c'.

The knob-like projections 80, 80', 80", 81 to 84 form the profiling of the tire contact surface of the contact section or track parts 4a, 4a', which increase the frictional connection between the tire chain and the tire. This prevents the tire from twisting or turning within the chain mesh or tire chain.

The spikes 12c, 12c', and 12d, 12d' (FIG. 9) are provided in addition to the spikes 12a, 12a', 12a" and 12b, 12b', 12b" that are disposed in the hook parts 50 to 55. These additional spikes are embodied in the same way as the spike 12a' of FIG. 8, and are held perpendicular in an opening of the sheathing 13a, 13a'. The spikes 12c, 12c' and 12d, 12d' are spaced from the adjacent spikes 12, 12a, 12a' or 12b, 12b', 12b", and are disposed at the points of a triangle, the base of which is disposed in the longitudinal central plane of the arms 14a, 15a; 14b, 15b, with the spikes 12a, 12a' or 12a', 12a" and 12b, 12b' or 12b', 12b" being disposed on the base of the imaginary triangle.

Figure 5:
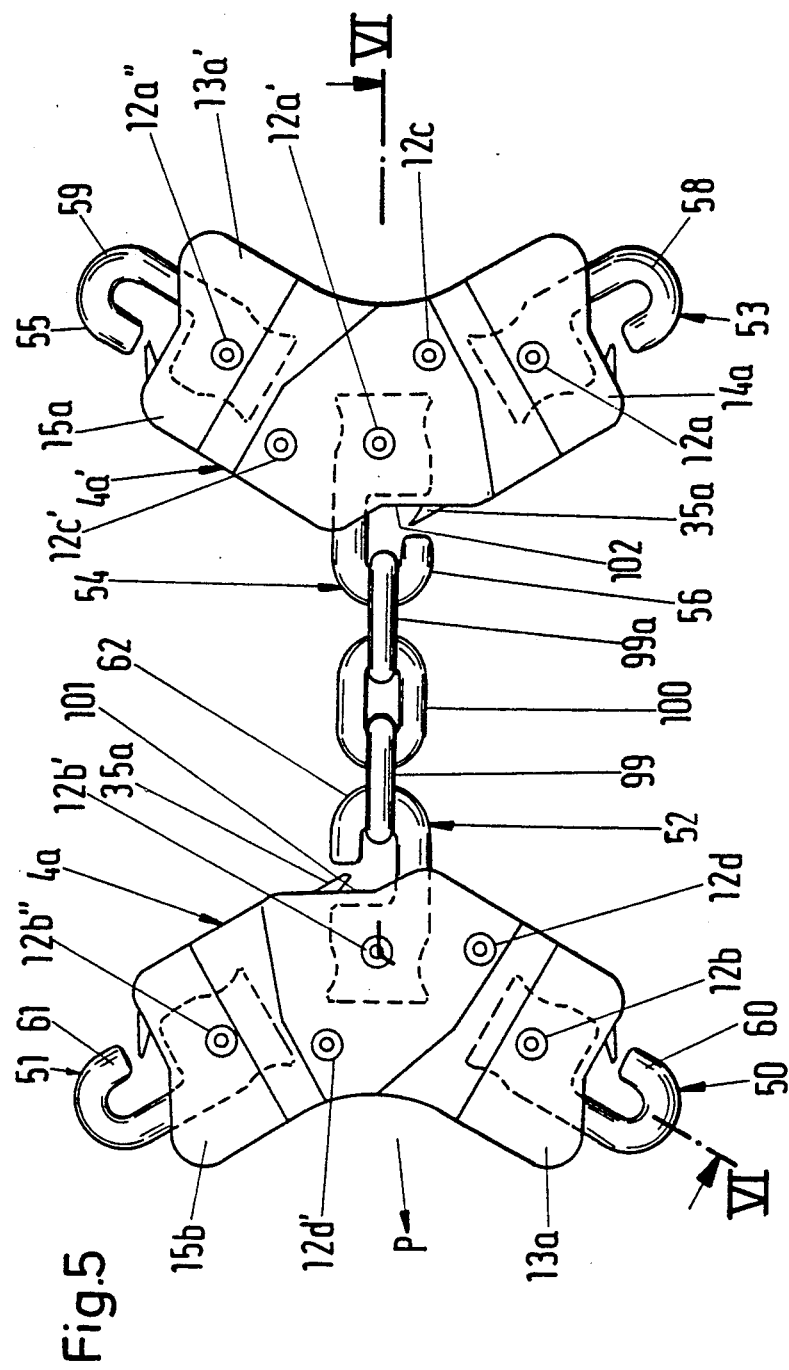
FIG. 5 is a view that illustrates a second exemplary embodiment of an inventive tire chain having a tread or contact section comprised of contact section parts with spikes, and in particular shows two interconnected contact section parts.

From FIG. 5 it can be seen that the arrangement of the spikes 12b, 12d, 12b', 12d', 12b" of the contact section or track part 4a relative to the spikes 12a, 12c, 12a', 12c', 12a" of the contact section or track part 4a' is preferably such that the spikes 12a and 12b, 12a' and 12b' as well as 12a" and 12b" are disposed at the same level when viewed in the circumferential direction P of the tire chain, whereas the remaining spikes of the two contact section or track parts are disposed at different levels. Each contact section or track part 4a, 4a' has five spikes that are asymmetrically arranged in such a way that with a mirror-inverted arrangement of the contact section or track parts 4a, 4a' (FIG. 5), the spikes leave behind seven tracks on the ground. Thus, especially on ice, a very high traction and an excellent braking effect are provided.

On that side of the contact section or track parts 4a, 4a' that in operation faces the roadway (FIGS. 7, 9), a respective channel-like recess 85, 86 is provided in each arm 14b, 15b. These recesses extend from one edge 87, 88 of the arms 15b, 14b to the opposite longitudinal edge 89, 90. The recesses 85, 86 preferably extend perpendicular to the longitudinal central axis of the arms 14b, 15b. The one half 91, 92 of the recesses 85, 86 has a constant width and extends between the spikes 12a", 12c' or 12c and 12a, whereas the other recess half 93, 94 widens toward the outside. For this purpose, that longitudinal edge 95, 96 of the recesses that faces the hook part 54 is inclined inwardly at an angle, whereas the other longitudinal edge 97, 98 extends linearly. The recesses 85, 86 form a profiling of the contact section or track parts 4a, 4a' that has the advantage that they bring about an improved traction and braking effect, especially in snow, and also bring about a greater flexibility and ability to conform to the tire.

As with the previously described embodiment of FIGS. 1 to 4, the contact section or track parts 4a, 4a' are interconnected via annular and connecting links 99, 99a, 100 (FIGS. 5, 6).

The annular links 99, 99a are suspended in the facing hooks 62, 56 of the hook parts 52, 54. In order to prevent the annular links from unintentionally becoming unhooked, projections 35a, 35a' that narrow the introduction opening of the hooks are provided on the adjacent edges 101, 102 of the sheathings 13a, 13a'.

However, in contrast to the embodiment of FIGS. 1 to 4, the projections 35a, 35a' are longer and narrower, so that they narrow the introduction opening even further, thereby reliably preventing an unintentional unhooking of the annular links 99, 99a. The projections 35a, 35a' extend at an angle from the sheathing 13a, 13a' to within the introduction opening of the hook (FIG. 5). As a result, the chain links can easily be suspended in the hooks, during the process of which the projections 35a, 35a' are pressed resiliently away. As a result of their inclined orientation, the projections 35a, 35a', despite their flexibility, prevent the chain links from unintentionally becoming unhooked.

The present invention is, of course, in no way restricted to the specific disclosure of the specification and drawings, but also encompasses any modifications within the scope of the appended claims.

What we claim is:

1. In a tire traction chain that has a tread or contact section with spikes, and two side sections, the improvement wherein:
    said tread or contact section is comprised of plate contact section parts in which said spikes are secured, with said contact section parts being linked with one another and with said side sections and to effect said linking, said contact section parts are provided with at least two connecting elements; each of said contact section parts being provided with a sheathing of elastomeric material, with said connecting elements being disposed in said sheathing;
    each of said connecting elements is comprised of a holding part that is disposed in said sheathing, and a hook that extends beyond said sheathing;
    said holding part being provided with at least one spike; and
    said connecting elements of a given contact section part being disposed in a Y-shaped configuration relative to one another in said sheathing.

2. A tire traction chain according to claim 1, in which each of said contact section parts comprises a metallic support body that is surrounded at least in part by a sheathing of elastomeric material.

3. A tire traction chain according to claim 2, in which said support body comprises three arms that are disposed in such a way as to impart to said support body an approximately Y-shaped configuration.

4. In a tire traction chain that has a tread or contact section with spikes, and two side sections, the improvement wherein:
    said tread or contact section is comprised of plate contact section parts in which said spikes are secured, with said contact section parts being linked with one another and with said side sections and to effect said linking, said contact section parts are provided with at least two connecting elements; each of said contact section parts being provided with a sheathing of elastomeric material, with said connecting elements being disposed in said sheathing;
    each of said connecting elements is comprised of a holding part that is disposed in said sheathing, and a hook that extends beyond said sheathing;
    said holding part being provided with at least one spike;
    said sheathing being provided with two arms that are disposed in such a way as to impart to said sheathing a V-shaped configuration, with each of said arms having disposed therein one of said connecting elements; and
    each of said contact section parts being provided with a third connecting element that is disposed in a transition region between said two arms.

5. A tire traction chain according to claim 4, in which said sheathing is provided with further spikes in a region thereof between adjacent connecting parts.

6. A tire traction chain according to claim 5, in which said further spikes are disposed in portions of said arms that are remote from one another.

7. A tire traction chain according to claim 4, which includes securing elements for securing said spikes in a perpendicular position relative to said sheathing.

8. A tire traction chain according to claim 7, in which each of said contact section parts has a tire-engagement surface that is adapted to face a tire and is provided with knob projections in which said securing elements are disposed.

9. A tire traction chain according to claim 8, which includes further knob projections on said tire-engagement surface.

10. A tire traction chain according to claim 9, in which said further knob-like projections are disposed adjacent to said further spikes on a different portion of said arms.

11. A tire traction chain according to claim 9, in which all of said projections are tapered outwardly in the manner of a truncated cone.

12. A tire traction chain according to claim 4, in which said sheathing has an outer surface that is adapted to face a roadway and is provided with profiling means.

13. A tire traction chain according to claim 12, in which said profiling means comprises at least one channel recess that is formed in said sheathing.

14. A tire traction chain according to claim 13, in which said profiling means comprises two recesses, one in each of said arms.

15. A tire traction chain according to claim 14, in which said recesses widen outwardly in a portion of said arms.

16. A tire traction chain according to claim 15, in which said widened portions are directed in opposite directions.

17. In a tire traction chain that has a tread or contact section with spikes, and two side sections, the improvement wherein:
    said tread or contact section is comprised of plate contact section parts in which said spikes are secured, with said contact section parts being linked with one another and with said side sections, each of said contact section parts comprising a metallic support body that is surrounded at least in part by a sheathing of elastomeric material, said support body comprising three arms that are disposed in such a way as to impart to said support body an approximately Y-shaped configuration, two or said arms having essentially the same length and being longer than the remaining arm.

18. A tire traction chain according to claim 17, in which, to effect said linking, said contact section parts are provided with at least two connecting elements; and in which each of said contact section parts is provided with a sheathing of elastomeric material, with said connecting elements being disposed in said sheathing.

19. A tire traction chain according to claim 18, in which each, of said connecting elements is comprised of a holding part that is disposed in said sheathing, and a hook that extends beyond said sheathing.

20. A tire traction chain according to claim 19, in which said holding part has a plate configuration.

21. A tire traction chain according to claim 19, in which said holding part is provided with at least one spike.

22. A tire traction chain according to claim 21, in which said spike is centrally disposed on said holding part.

23. A tire traction chain according to claim 17, in which said sheathing is provided with two arms that are disposed in such a way as to impart to said sheathing a V-shaped configuration, with each of said arms having disposed therein one of said connecting elements.

24. A tire traction chain according to claim 17, in which said two longer arms are each provided with successive, essentially equally spaced-apart recessed portions for said spikes.

25. A tire traction chain according to claim 24, in which said spikes have two ends, one of which extends outwardly beyond said sheathing, with at least that end of said spikes that extends beyond said sheathing being profiled.

26. A tire traction chain according to claim 25, in which that end of said spikes that extends beyond said sheathing being provided with a stud.

27. A tire traction chain according to claim 26, in which that end of said spikes that is remote from said stud is provided with a head.

28. A tire traction chain according to claim 27, in which said heads of said spike are disposed in said recessed portions of said arms of said support body.

29. A tire traction chain according to claim 17, in which said arms of said support body have free ends, each of which is provided with a hook.

30. A tire traction chain according to claim 29, in which each of said hooks has an approximately L-shaped hook opening.

31. A tire traction chain according to claim 30, in which each of said hooks has an introduction opening that opens into said hook opening and has at least one narrowing.

32. A tire traction chain according to claim 31, in which said narrowing is formed by at least one elastically resilient projection on said sheathing.

33. A tire traction chain according to claim 32, in which each of said hooks has a free hook end, and in which said projection is knob-like and is provided on an end face of said sheathing that is disposed across from said free hook end.

34. A tire traction chain according to claim 33, in which said sheathing on said free hook end has a portion, across from said projection, that has a thickness that is slightly greater than the sheathing thickness of the remainder of said hook.

35. A tire traction chain according to claim 32, in which said sheathing is provided with outwardly extending further projections that are disposed at approximately the same level as said elastically resilient projections and partially delimit said introduction openings 36. A tire traction chain according to claim 25, in which said sheathing surrounds more than half the length of said spikes.

37. A tire traction chain according to claim 36, in which said sheathing surrounds nearly the entire length of said spikes.

38. A tire traction chain according to claim 36, in which the thickness of said sheathing on that side of said support body where said sheathing surrounds said spikes is greater than the thickness of said sheathing on the opposite side of said support body.

39. A tire traction chain according to claim 17, in which said tread or contact section comprises identical contact section parts that are linked with one another by at least one chain link.

40. A tire traction chain according to claim 17, in which said tread or contact section comprises identical contact section parts that are linked with one another by at least three chain links.

41. A tire traction chain according to claim 17, in which adjacent contact section parts are arranged in a mirror-inverted manner relative to one another and form cross-shaped portions of said tread or contact section.

42. A tire traction chain according to claim 17, in which said contact section parts have outwardly extending arms that extend transverse to a circumferential direction of said tread or contact section and that are provided with hooks that are suspended in chain portions that are connected to said side sections.

43. A tire traction chain according to claim 17, in which said contact section parts are detachably connected to said side sections.

* * * * *